March 13, 1956 J. F. ZALESKI 2,738,406
RADIO FREQUENCY VULCANIZING
Filed Sept. 20, 1951 3 Sheets-Sheet 1

INVENTOR.
JOHN F. ZALESKI
BY H. L. Mackey
ATTORNEY

March 13, 1956  J. F. ZALESKI  2,738,406
RADIO FREQUENCY VULCANIZING

Filed Sept. 20, 1951  3 Sheets-Sheet 2

INVENTOR.
JOHN F. ZALESKI
BY
*H. S. Mackey*
ATTORNEY.

INVENTOR.
JOHN F. ZALESKI
BY
ATTORNEY.

United States Patent Office 2,738,406
Patented Mar. 13, 1956

2,738,406

RADIO FREQUENCY VULCANIZING

John F. Zaleski, Valhalla, N. Y., assignor to General Precision Laboratory Incorporated, a corporation of New York Application September 20, 1951, Serial No. 247,520

10 Claims. (Cl. 219—10.55)

This invention relates to the art of treating a mass of material capable of having its physical and/or chemical properties altered by heat. The invention particularly relates to the treatment of a mass of material, preferably in a mold which gives the material the final shape of an article, by subjecting the material to electrical energy at radio frequencies. Examples of such materials are rubber, rubber substitutes and thermo-setting resins.

The present invention contemplates novel means for supplying electrical energy at radio frequencies to a chamber or zone formed by walls, usually of electrically conducting material within which electromagnetic fields are confined without any radiation losses. The material of the walls constituting the boundary of the zone or chamber may be any which has a permeability substantially different from that of the material being treated such as to constitute an abrupt impedance discontinuity thereby causing the electromagnetic wave energy to be reflected and confined within the zone without appreciable electrical losses. The molds which are used to shape the final product or article may constitute the outer boundary of the zone but also there may be instances in which it will be desirable to confine the electromagnetic energy to only part of the volume of the mold cavity for purposes of effecting control of the distribution of the heating action.

The invention is particularly directed to the art of vulcanizing rubber pneumatic tire casings or mechanical goods made of rubber or rubber substitutes where the mold for shaping the article constitutes the treating chamber. Although it is the primary object of the invention to provide apparatus for vulcanizing pneumatic tire casings, the invention may also be used for vulcanizing articles such as rubber motor mountings, grommets and analogous articles which may or may not have metal inserts.

The broader aspect of the invention embraces means and method of uniformly treating material by high frequency in a confined zone. The confined zone reduces losses but in the prior art creates reflections and standing waves which normally causes non-uniform treatment.

The heating effect of electromagnetic wave energy on any material having a dielectric constant greater than zero is very well known. The exact manner in which the heating is caused is not known although it is generally considered to be caused by hysteresis loss in the material which is analogous to the hysteresis loss in an iron core and additionally to the I²R loss as a result of eddy currents induced in the material by the high frequency energy. There may be other reasons, but regardless of the exact reason it is well known that the stresses caused in the dielectric material as the result of the pulsating electromagnetic and electrostatic fields creates heat internally of the material. The primary advantage of heating by high frequency energy is that the heat is generated within the material and therefore the thermal loss is a minimum and it is not necessary to apply temperatures to the outer surfaces of the mass so high as to possibly cause deterioration thereof in order to cause the transfer of sufficient heat internally of the mass to produce the proper state of treatment, such as vulcanization or polymerization. Also, because the heat resulting from the high frequency treatment is generated within the material the time necessary to treat the material is greatly reduced, thereby greatly reducing the cost of manufacture.

There is a great volume of prior art relating to the treatment of materials which are capable of having their physical and chemical characteristics altered by the application of high frequency electrical fields but in most of this prior art considerable difficulty has been encountered in providing a system which is efficient from a standpoint of the transfer of the energy to the load, in this instance, the material under treatment. Also another difficulty has been encountered in attempting to provide uniform treatment of all of the mass of the material. This difficulty is encountered in vulcanizing the rubber in pneumatic tires because of the non-symmetrical partial crescent shape. Also there is a tendency for conducting inserts, such as the metal tire beads and the metal reinforcement in the sidewalls of tires to absorb a disproportionate amount of energy causing excessive localized heating of the adjacent thermoplastic material. Any metal reinforcement in the sidewall of the tire casing tends to divide the space in the mold cavity into two concentric toroidal zones or perhaps more nearly crescent zones, which further complicates the problem of uniform treatment of the rubber in the tire casing. The non-uniform thickness of the tire casing aggravates the difficulty.

As one specific example of the prior art, provision has heretofore been made for treating or vulcanizing the rubber of a pneumatic tire casing by applying the high frequency energy to electrodes placed on the opposite sides of the tire casing. With this arrangement it is substantially impossible to produce uniform heating of the tire casing and, furthermore, using such method of application of the high frequency energy to the load, that is, the lossy dielectric of the tire casing, there is a great loss of energy through electromagnetic radiation to the space adjacent the electrodes. In other instances it has been proposed to vulcanize pneumatic tire casings by supplying the high frequency energy to an electrically confined zone into which the tire is introduced, the electrically confined zone completely encompassing the tire casing, and the mold in which the casing is confined. The difficulty in the latter instance, however, is that the embedded metal in the tire casing, such as the wire beads and any metallic sidewall reinforcing elements will absorb high frequency energy thereby causing excessive localized heating of the tire casing.

The inherent obstacles to completely effective, efficient high frequency heating of tires is the difficulty involved in controlling the form factor of the high frequency field, that is, the "E" vector orientation. The prior art does not provide any clue to the solution of the problem.

The present invention departs from all of these approaches to this problem and provides an apparatus which utilizes the tire mold cavity as an extension or part of a waveguide for the high frequency energy with the rubber of the tire casing, which is an imperfect dielectric, serving as the load that absorbs the energy. In this way there is no energy loss due to high frequency radiation and by properly matching the impedance of the source of energy to the impedance of the mold cavity and its load there is substantially no energy loss, resulting in the conversion of substantially all of the high frequency energy into heat which is developed completely within the body of the tire casing. The present invention provides a system with means for making appropriate adjustment to vary the distribution of the high frequency energy within the mold cavity to compensate for the variation in thickness and configuration of the tire in order to obtain uniform vulcanization. Although the invention particularly as described in the illustrated embodiment is directed to the vulcanization of pneumatic tire casings, it is to be understood that the invention is not limited thereto and will be equally applicable to the treatment of other articles made of thermoplastic material where the shape of the mold is such as to lend itself to the present system of applying high frequency energy to a mold cavity.

There is in the prior art some devices which propose to treat materials, including the vulcanization of tires, by means of high frequency energy in the microwave range in what is referred to in one instance as a resonant or non-resonant chamber and in another instance as a chamber in which standing waves are produced. The presence of standing waves would normally indicate a resonant condition. However, in these prior devices no provision is made for controlling the E vectors in relation to any metallic inserts which might be in the body of the material under treatment or for changing the position of any standing waves which might be present and cause non-uniform treatment.

The term "high frequency" as used herein is intended to embrace a very wide range of frequencies, beginning with what is generally referred to as radio frequencies and extending up to and including microwaves. It will be apparent to those skilled in the art that the manner of feeding the energy to the load will have to be chosen in accordance with the teaching of the present invention.

One of the primary objects of the present invention is to provide improved apparatus for treating thermoplastic or thermosetting material which is capable of having the chemical or physical properties altered by the application of high frequency energy. Another object is to provide improved apparatus in which such material may be treated in situ in a mold by high frequency electromagnetic energy.

Another object is to provide an improved apparatus for treating plastic material in a mold which is used to shape the final product or article with the walls of the mold being utilized to confine the electromagnetic energy.

Another object is to provide improved apparatus for subjecting plastic material to high frequency energy while the material is confined in a mold having a generally toroidal cavity.

Another object is to provide an improved apparatus for treating plastic material with high frequency electrical energy wherein the cavity of a mold in which the plastic material is formed into final shape constitutes a part of a waveguide or coaxial cable through which the energy is transmitted from the high frequency source.

A still further object is to provide an improved apparatus for treating material in a mold having a generally toroidal cavity and wherein the electromagnetic field is moved with respect to the material in order to provide uniform treatment of the material. Other and further objects will become apparent from the following description when considered in connection with the following drawings in which.

Figure 1:
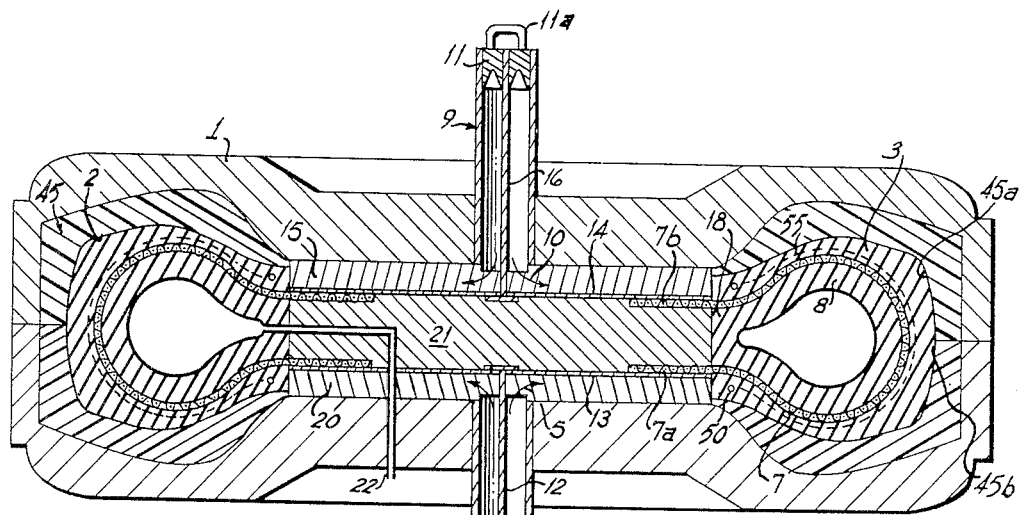
Figure 1 is a cross-sectional view of a tire in a tire mold and showing the manner in which the microwave energy is supplied to the mold cavity.

Fundamentally, the present invention contemplates a novel method of feeding high frequency energy into the cavity of a shaping mold, such as a tire mold, by so connecting the cavity of the mold through a waveguide or coaxial cable to a source of high frequency energy so that the cavity constitutes a part of the waveguide or transmission system.

To facilitate the explanation of the invention, reference should be made to certain fundamental aspects of high frequency technique which are familiar to those skilled in the art. The manner of transmission of high frequency energy through waveguides and coaxial cables in which the modes of propagation are functions of the waveguide and coaxial line dimensions and of the frequency, are well known. Also, the effects of variations in the dimension of such waveguides and coaxial cables upon the reflection of the energy, thus producing standing waves, also are well known. The logical approach to the present invention is to consider first an elementary length of hollow waveguide with one end connected to a suitable high frequency generator and the other end of the waveguide closed by a shorting plug having substantially zero resistance. For frequencies transmitted in the TE mode, such a waveguide will have a characteristic wave impedance $$Z_0 = 377 \frac{\lambda_g}{\lambda_0} \qquad (1)$$

where $\lambda_g$ is the wave length in the guide, $\lambda_0$ is the wave length in free space or air. In a hollow waveguide $\lambda_g$ is usually greater than the wave length in free space. On the other hand, in air insulated coaxial cables propagating in the fundamental TEM mode, $\lambda_g$ is equal to $\lambda_0$ so that the wave impedance becomes 377 ohms. Let it be assumed that a power dissipating or absorbing device, such as a carbon resistance element having a surface impedance equal to the wave impedance is placed at a point which is a distance of $\lambda_g/4$ from the closed end of the waveguide. Also assuming that there are no other impedance discontinuities in the waveguide between the high frequency generator and the closed end, theoretically the resistance element will absorb all of the incident power because the surface impedance of the resistance element is equal to the wave impedance of the waveguide at that point and there will be no reflected power. Under such conditions the high frequency energy is said to be matched into the load, represented by the power dissipating resistance, and there will be no reflections to any other points of the system so that all of the energy is absorbed in the load. For matched conditions the action is the same in coaxial cables as for the hollow waveguides, it being understood, of course, that the physical position of the resistance element with respect to the terminated end will be different because of the difference in propagation velocity in the two types of transmission systems.

The point at which the 377 ohm characteristic wave impedance exists will be different from what it was in the first supposition, mentioned above, if some impedance discontinuity is introduced, such as a constriction or enlargement. However, the position of this point can be controlled or varied by varying the position of the shorting plug in the waveguide or coaxial cable to match the new impedance condition. This adjustable impedance matching transformer action can be made to match the incident power into a wide range of load impedances, represented by the resistance element impedance discontinuity.

Preferably, in both the waveguides and coaxial lines the frequencies used are so related to the size of waveguide or coaxial line so that propagation takes place in the respective fundamental modes. Under these conditions, in a coaxial line, the electrical field is radial between the inner and outer conductors and the field distribution will be peripherally uniform, while in a round waveguide with propagation taking place in the dominant mode the field is peripherally non-uniform. To avoid the non-uniform heating which would result from the unsymmetrical field in the case of the waveguide, means may be provided for causing relative movement between the unsymmetrical field and the circumference of the waveguide and mold. An example of one way to produce this relative movement is the embodiment of Figs. 4 and 5 which illustrates means for producing a rotating or circularly polarized field.

On the other hand, both in the case of waveguides and coaxial lines any lack of uniformity of the field in the transverse circumference, due to impedance mismatch may be compensated for by varying the impedance matching stub as hereinafter discussed in more detail.

In the present invention the tire casing made of plastic material is used as the load or power absorber with the tire mold so connected either to the coaxial cable or waveguide as to constitute an extension or enlargement of either of the latter.

One of the salient features is the manner in which high frequency energy is supplied efficiently to the material under treatment in a mold cavity without the necessity of any extraneous elements, such as electrodes disturbing the shape or contour of the final article.

Referring specifically to Fig. 1 the tire mold 1 having the usual cavity 2 for shaping and molding a pneumatic tire casing 3 is connected to a high frequency generator 4 by means of a suitable coaxial cable 6. As will be understood from the subsequent description the coaxial cable 6 is so connected electrically to the tire mold that the cavity constitutes, in effect, a circumferential enlargement of a section of the coaxial cable 6 with the inner surface of the mold cavity serving as the outer conductor and a wire mesh 7 surrounding the outer walls of an airbag 8 constituting the inner conductor in the extension.

The mold 1 is divided into two halves in a conventional manner and the coaxial line 6 is connected to one half while a suitable tuning stub 9 is conected to the other half. The stub 9 is provided with a suitable adjustable shorting plug 11 and this plug may be adjusted through means of a handle 11a for the purpose of matching the radio frequency energy into the impedance discontinuity of the coaxial cable produced by the tire cavity 2 and the power absorbing load, represented by the tire casing 3. Means, not shown, may also be provided for automatically and continuously moving the plug 11 back and forth for the purpose of varying the position of any standing waves.

Since the high frequency currents do not penetrate the conducting material of the tire mold and the wire mesh 7 to any appreciable extent, there can be no high frequency currents or charges developed on the outside of the tire mold and thus the surrounding outside region is free of any electromagnetic waves and there can be no radiation loss.

In order to provide the continuity of the inner conductor 12 of the coaxial cable 6 the expansible wire mesh 7 is provided with suitable extensions 7a and 7b which are in electrical contact with metal conducting discs 13 and 14. The conducting disc 13 is electrically connected to the inner conductor 12 and the disc 14 is electrically connected to the inner conductor 16 in the matching stub 9.

In order to provide a path for the high frequency energy around the toroidal cavity of the tire mold, and at the same time completely confine the tire casing the conventional tire mold is modified to provide radio frequency paths through a solid dielectric material from the region of the central portion of the tire mold. The path of the high frequency energy is indicated by the arrows, the arrows 5 representing incident power and the arrows 10 representing reflected power. To this end, the central portion on the mold sections are recessed to accommodate suitable low-loss dielectric discs 15 and 20. The thickness of these discs is preferably equal approximately to the width of the tire beads 18, the dielectric discs having sufficient physical strength to constitute spacers which position the conducting discs 13 and 14 from the central regions of the respective halves of the tire mold thus providing the path for the high frequency energy. It is to be noted that the inner extensions 7a and 7b of the wire mesh 7 overlap the metal discs 13 and 14, respectively, thus preventing any loss of high frequency energy. A suitable disc-like spacer 21 is provided between the metal discs 13 and 14. This spacer may be of any suitable material having the necessary mechanical strength. It may be made of a conductor or nonconducting material and its peripheral surface supports the inner circumference of a conventional airbag 8. If it is made of metal of sufficiently high conductivity the metal plates 13 and 14 can be dispensed with. A suitable inflating stem 22 is provided for supplying inflating pressure to the airbag in accordance with conventional practice in the manufacture of pneumatic tires. It will be readily understood that if desired some heating fluid may be introduced through the inflation stream 22 for the purpose of preheating the tire, although, of course, in the present instance it is contemplated that the heat for vulcanizing the tire will be supplied primarily by the high frequency energy.

Although the cavity in the tire mold is of generally toroidal shape, the inner surface of the cavity in a conventional pneumatic tire mold is by no means smooth and consequently the rather abrupt changes in the shape will produce impedance discontinuities and consequent reflections of high frequency energy within the mold cavity. As previously mentioned, the shorting plug 11 of the impedance matching stub can be adjusted to effect a general matching of the high frequency energy into the material of the tire casing, which is compounded in such manner as to inherently constitute a lossy dielectric. However, the adjustment of the shorting plug 11 cannot insure complete uniformity of the high frequency fields inside of the tire cavity and as a result certain portions of the tire will be subjected to nonuniform heating due to standing waves. This localized heating results in so-called "hot-spots" which can be minimized by providing means for changing the position of the shorting plug 11 thus changing the position of the high voltage gradients or standing waves in the tire mold cavity. Such movement of the plug 11 will vary the position of the standing wave high frequency field in the transverse circumference of the tire casing, i. e. the position in the cross section of the tire as illustrated in Fig. 1. Since it is intended that the frequency be such that only the dominant mode will be propagated, the electric field will be uniformly distributed radially around the periphery. A coaxial line will propagate energy in the dominant mode only so long as the frequency is such that the wave length is above the critical value determined by the equation $$\lambda = 2\pi \frac{b+a}{2} \qquad (2)$$

where $b$ is the inner radius of the outer conductor and $a$ is the radius of the inner conductor.

Figure 3:
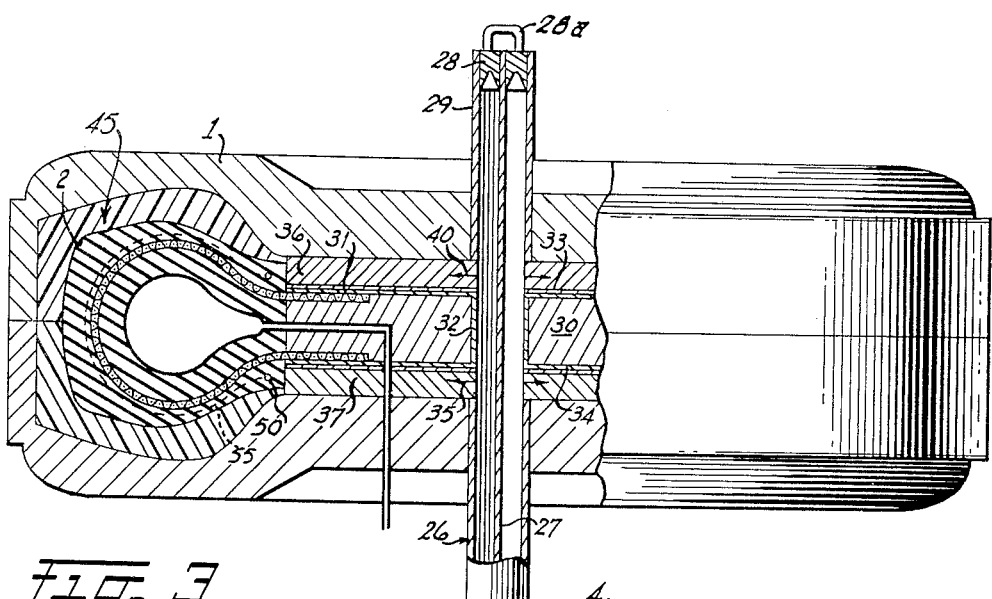
Figure 3 is a modified form of the invention shown in Figs. 1 and 2.

Figure 3 shows a modified form of the invention, identical in all respects as far as general theory is concerned with that of Fig. 1, but instead of the mold cavity being fed serially from the waveguide terminus it is supplied in shunt from the coaxial cable 26. In this embodiment the inner conductor 27 of the coaxial cable 26 extends continuously to the shorting plug 28 of the impedance matching stub 29. Two parallel paths for microwave energy are provided between the inner surfaces of the central part of the mold cavity and a spool-like element 31 having a central portion 32 collinear with the outer conductor of the waveguide 26 and disc flanges 33 and 34. Suitable disc-like spacers 30, 36 and 37 separate the flanges 33 and 34, respectively, from the central portion of the respective halves of the tire mold 1. In this modified form the direction of the flow of high frequency energy is shown by the arrows 35 and 40, all representing both incident and reflected energy. The shorting plug 28 may be adjusted within the impedance matching stub 29 by means of the handle 28a to effect the proper impedance match and to cause the high frequency energy to be absorbed by the tire, which constitutes the load.

Figure 2:
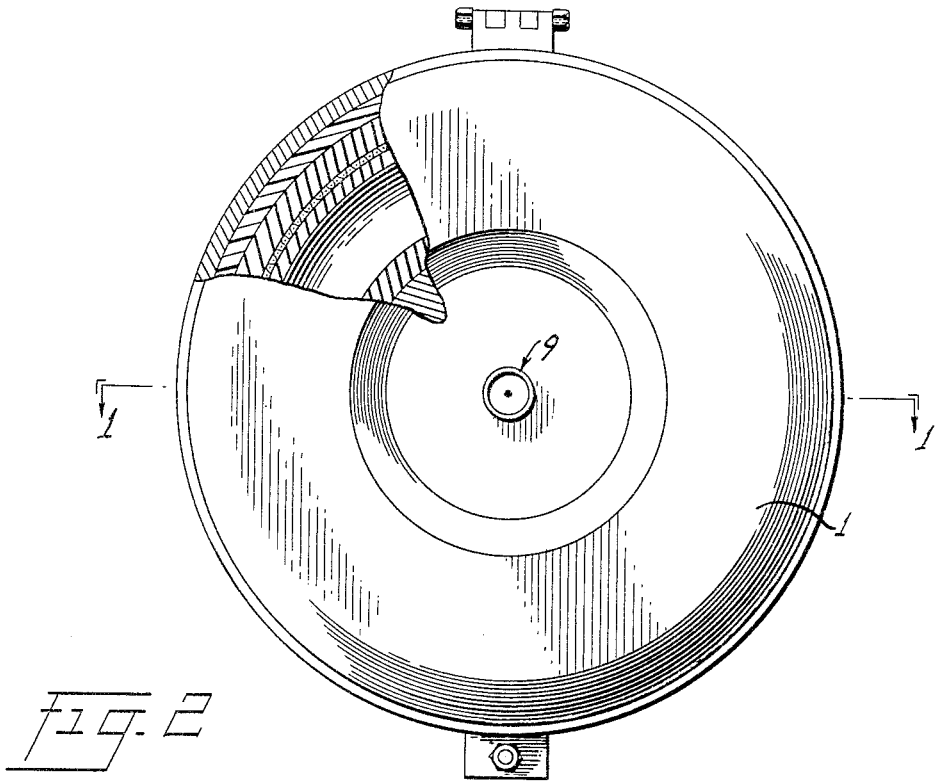
Figure 2 is a plan view of Fig. 1.

In addition to the non-uniform heating of the tire due to standing waves caused by reflections resulting from impedance mismatches, the variations in thickness of the different portions of the tire may also cause non-uniform heating. Naturally the voltage gradients will be greater across the thinner portions of the tire than across the thicker portions. In the embodiments of Figs. 1, 2 and 3, a suitable liner 45 of low loss dielectric material is provided in the tire mold cavity for the purpose of varying the potential gradient to compensate for the variations in thickness of the rubber. As an example, at points such as 45a, where the rubber is relatively thick, the dielectric liner is thinner and at points, such as at 45b where the rubber is relatively thin, the dielectric liner is thicker.

The use of the dielectric liner is also applicable to the other modified form wherein the high frequency energy is supplied to the mold cavity through a waveguide instead of the coaxial cable.

Although it would be preferable to have a perfect impedance match between the transmission line and the absorbing load, it will be appreciated that if a frequency is chosen so that the wavelength is large compared to the dimension in the toroidal transverse direction the high frequency field intensity will be substantially uniform even with a portion of a standing wave existing along the transverse circumference and the peripheral field distribution will likewise be substantially uniform since the frequency and dimensions are so chosen that only the fundamental TEM coaxial mode will be propagated in the toroidal mold cavity. For this reason, the effects of any incidental impedance mismatch is reduced and this can be further reduced by moving the shorting plugs of the matching stubs as previously explained so that the average power absorbed by the tire over a given time interval will be uniform throughout the body of the tire.

In the instance of watch-case type tire molds the low-loss dielectric liner 45 serves as the usual molding inserts which carry the tread pattern or configurations. Also, it should be readily apparent that in dual or multiple tire vulcanizers more than one mold can be placed side by side and the high frequency energy can be supplied in cascade, that is, the plug in the matching stub of one mold may be removed and the end of the stub connected to the coaxial cable input of the other mold. Then the two molds will constitute two spaced enlargements in a coaxial cable and the impedance matching stub for the end mold can be controlled in the manner described for reducing reflections or for changing the position of the standing waves.

In order to completely appreciate the significance of the present invention, consideration must be given to the fact that concepts of voltage differences and circuits for electrostatics and low frequencies are quite different from those concepts associated with high frequencies and particularly microwave energy where the "circuits" are so short physically that the current in one portion may be going one direction, while the current in another portion of the circuit is going in the opposite direction. At these high frequencies the energy is primarily confined to the dielectric surrounding the conductor because high frequencies do not penetrate deeply into a conductor. At one instant the energy is in the electric field and the next instant in the magnetic field. If the terminating conditions are ideal, all the energy will be absorbed by the load, while under other conditions all the energy will not alternate between the electric and magnetic fields and some of it will be lost or radiated in the electromagnetic field. An appreciation of this difference is necessary in order to understand completely how the invention may be applied to the manufacture of numerous articles of manufacture other than tires where it is desired to treat plastics in situ, particularly where the article or product have a nonsymmetrical shape and where there may or may not be electrically conducting metallic inserts in the plastic material under treatment.

At low frequencies the term "circuit" usually connotes a path over which electrons may flow from one point to another and in connection with heating circuits the latter term usually refers to the flow of electrons or electric current through the material under treatment, the source of energy being applied to the material under treatment through a pair of electrodes with the current passing from one electrode through the material back to the other electrode and the source. However, the "circuits" with which the present invention is concerned may be referred to as "self-enclosing conducting system" in which all of the energy in the electric, magnetic and electromagnetic fields is completely restricted within an electrically confined zone.

In the prior art open condenser type of apparatus for supplying high frequency energy to lossy dielectric materials, such as pneumatic tire casings, in addition to the energy loss to the immediate vicinity there is the added problem of loss of energy in the form of high frequency electromagnetic field radiation. In accordance with the present invention the high frequency energy is delivered from the generator to the absorbing load, which is the pneumatic tire, by means of a self-enclosing conducting system and the tire is so located in that system and the system is terminated in such a manner as to cause absorption of substantially all of the energy by the tire casing without any substantial reflection back to the source or without loss to the surrounding region.

In the forms of the invention previously described where the high frequency energy is supplied through a coaxial cable, the E vectors will generally be oriented so that they extend substantially at right angles to the surfaces of the walls of the tire casing at all points, whereby the wire reenforcing elements 50 in the beads 18 will not have any currents induced therein. Since wire reenforcing elements 50, and in the case of heavy duty tires, the metallic reenforcing elements 55 in the side-walls are electrically isolated in the tire casing the E vectors will be substantially undisturbed thereby and will extend or bridge across from one conductor of the coaxial cable to the surface of the metal elements and from the metal elements to the other conductor of the coaxial cable. Since the high frequency currents do not penetrate conductors to any appreciable extent there will be substantially no losses from Foucault or eddy currents. Also because of the direction of the E vectors the accompanying quadrature H vectors or lines of magnetic force will not induce any voltage in the metal elements and therefore there will not be any excessive heating thereof.

The depth of the penetration of high frequency currents into a conductor is a function of the resistance of the conductor. Therefore, preferably the metal reenforcing elements 50 and 55 should have a very thin copper or other highly conductive coating.

Figure 4:
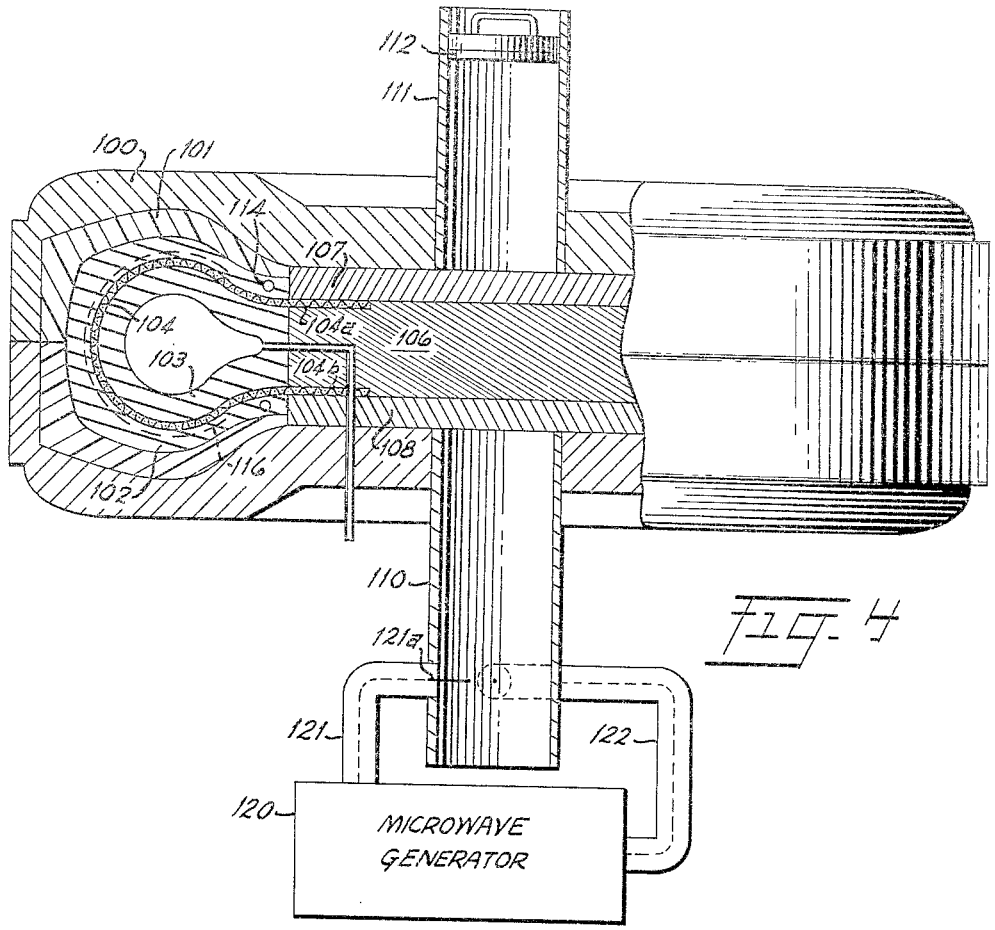
Figure 4 is a modified form of the invention showing the manner in which a rotating electromagnetic field may be applied to the tire mold cavity.
Figure 5:
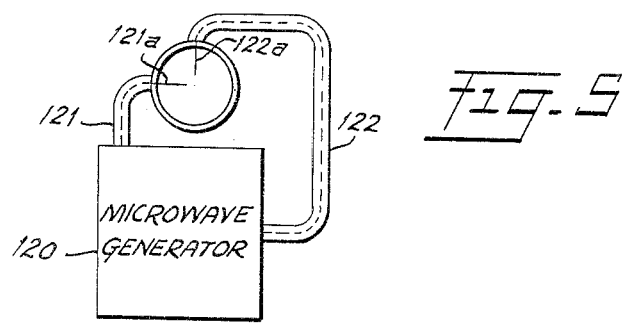
Figure 5 is a partial section of the line 5—5 of Fig. 4.

In the modified form of the invention as shown in Fig. 4, the high frequency energy is supplied to the tire mold cavity by means of a hollow waveguide. In this modification a two section mold 100 similar to that shown in the previous embodiment is provided with a cavity having a pair of mold inserts 101. For reasons described in connection with the previous embodiment the mold inserts 101 may be made of low-loss dielectric material for the purpose of controlling the voltage gradients and, therefore, the uniformity of treatment of a tire casing 102 in the mold cavity. As in the previous embodiment the outer surface of the conventional air bag 103 is surrounded by a metallic mesh conductor 104 having extensions 104a and 104b which are adapted to engage the sides of a central metallic core 106 which serves as the mechanical support for the bead zone of the air bag 103.

The central portions of the two sections of the mold 100 are recessed by an amount substantially equal to the thickness of the beads of the tire to accommodate low-loss dielectric discs 107 and 108 which provide the paths for the high frequency energy into the mold cavity.

The self-enclosing conducting system of this modification includes a waveguide 110 which is electrically connected to the central portion of the lower section of the tire mold 100 so that the high frequency energy from the waveguide is coupled directly into the path provided by the dielectric disc 108. A suitable impedance matching unit 111 is connected to the central portion of the upper section of the tire mold 100 and is coupled directly to the high frequency path provided by a dielectric disc 107. The impedance matching unit 111 is provided with a conventional movable shorting plug 112, the position of which can be varied within the unit 100 for the purpose of producing the proper balance between the incident and reflected high frequency energy in the closed high frequency system thus insuring that all of the high frequency energy will be absorbed by the tire casing 102 in the toroidal region of the self-enclosing system. The explanation of this modification is substantially identical with that of the previous embodiment wherein the energy is fed through coaxial cable. The orientation of the E vectors will be substantially at right angles to the surface of the tire casing since the metallic disc 106 and the wire mesh 104 effectively constitutes the inner conductor of a short coaxial cable which extends between the waveguide 110 and the impedance matching stub 111. Therefore, the metal reenforcing element of the tire beads 114 as well as any metal reenforcing elements 116 in the walls of the tire casing will be at substantially right angles to the E vectors and, therefore, will not absorb high frequency energy. The main advantage of this modification is that it is better adapted to the utilization of the higher frequency in the microwave range. It will be readily apparent to those skilled in the electronic art that it may be necessary to provide appropriate impedance modifying devices at different points along the self-enclosing system for the purpose of preventing the excitation of higher mode oscillations because it is desirable that the energy be transmitted through the self-enclosing system only in the dominant mode.

If desired, high frequency energy of fixed polarization can be supplied to the waveguide 110. However, with the dominant TE11 mode in a circular waveguide all the electric field will be non-uniform peripherally and, therefore, the field should be rotated relative to the periphery of the tire so that the tire will be uniformly heated. The high frequency energy may be fed through a fixed polarizing iris to the waveguide 110 and the tire and mold rotated about its axis, or vice versa. In the preferred form as shown in Fig. 4, means are provided between a microwave generator 120 and the lower end of the waveguide 110 for the purpose of continuously rotating the plane of polarization and, therefore, varying the position of any standing wave which might be developed circumferentially within the toroidal tire cavity. In the preferred embodiment the rotation of the plane of polarization is produced electronically by feeding high frequency energy from the generator 120 to the lower end of the waveguide 110 through a pair of coaxial cables 121 and 122 in such a manner that the energy from these cables are in space and phase quadrature. As will be seen from Fig. 5, the inner conductors 121a and 122a of the respective cables 121 and 122 project into the interior of the waveguide 110 in the same horizontal plane but at right angles to each other. The ends of these inner conductors constitute coupling probes, each having a length substantially equal to a quarter wave length or less at the operating frequency. The coaxial cable 122 is an odd one-quarter wave length longer or shorter than the coaxial cable 121 at the operating frequency and this causes the voltages in the probes 121a and 122a to be in phase quadrature, therefore producing in the waveguide 110 an electromagnetic wave with a transverse rotating electric field. The lower end of the waveguide 110 may be closed by a solid plate or may be terminated in any other appropriate manner so that the high frequency energy will be propagated only into the tire mold.

Figures 6, 7:
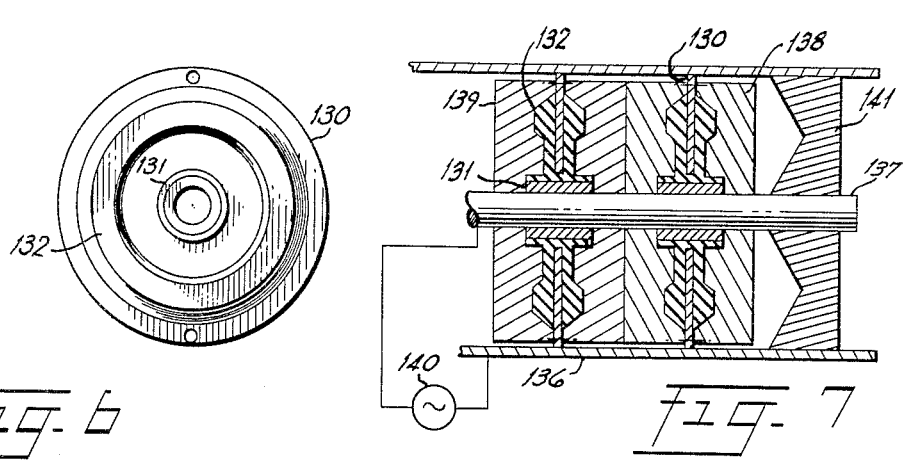
Figure 6 is a plan view of an article, such as a resilient form in which the vibration absorbing unit which may be vulcanized in accordance with the present invention.
Figure 7 illustrates the manner in which the article shown in Fig. 6 may be vulcanized in accordance with the present invention.

It is believed that it will be obvious from the foregoing description that the invention is not limited to the vulcanization or treatment of articles such as pneumatic tires and that it may be applied to any other articles. In Fig. 6 is shown an example of a rubber vibration insulator shock mounting of the general type having an annular plate-like element 130 and a cylindrical central element 131 between which is interposed an annular pad of rubber 132 with the inner portion of the element 130 being imbedded in the rubber and vulcanized thereto.

Fig. 7 illustrates the manner in which a plurality of these articles might be vulcanized simultaneously in a self-enclosing conducting system in the form of a coaxial cable having an outer annular metallic conductor 136 and an inner conductor 137. The inside diameter of the element 130 of the vibration insulator unit and the outside diameter of the inner conductor 137 is of such size as to fit the bore in the inner element 131 of the vibration insulator. The individual vibration insulator units may be enclosed in molds 138 and 139 made of low loss material. The plurality of these are then stacked and confined in a section of coaxial cable which may be energized in any suitable manner well known in the electronic art from a source of high frequency energy 140. It is to be understood that the ends of the section of the coaxial cable will be appropriately terminated to avoid the loss of high frequency energy from the ends. Also, at least one end should be provided with an adjustable shorting plug 141 which may be adjusted lengthwise to vary the position of any standing waves which might result from any impedance mismatch.

The high frequency energy may be supplied from a single source through suitable coaxial cables or waveguides to a plurality of treating molds. Preferable, in the case of the tire molds, a high frequency generator of the magnetron type may be coupled directly to a single tire mold or a pair of tire molds.

From the foregoing it will be seen that the present invention provides a novel arrangement for uniformly treating material with high frequency energy in a self-enclosing conducting system so that there can be no loss of energy through radiation to the adjacent region. The feature of making the treating chamber or mold a part of the self-enclosing system and matching out impedance, discontinuities increases the efficiency and the rate at which the material under treatment absorbs the microwave energy. One of the salient features is the manner of feeding the high frequency energy to the power absorbing load, such as the material being treated, in the cavity of the shaping mold without the use of any obstructions, such as electrodes, inductive or capacitive elements.

What is claimed is:

1. In combination, in apparatus for heating and shaping thermoplastic and thermosetting material, a self-enclosing high-frequency wave conducting system including two circular tubular sections, an intermediate mold section having a cavity for receiving and shaping said material to final form, said cavity being of generally toroidal shape, all of said sections being coaxially connected in wave-conducting relation, means connected to one of said tubular sections for supplying high frequency waves into said cavity, and means associated with the other of said sections for cancelling the effects of impedance discontinuities in said system to thereby substantially eliminate standing waves in said cavity.

2. In combination, in apparatus for heating and shaping thermo-plastic and thermo-setting material comprising, two circular cylindrical sections, an intermediate mold section having an inner cavity surface which is a surface of revolution but has a diameter varying in an axial direction, all of said sections being arranged coaxially and being connected in wave-conducting relation, means coupled to one of said cylindrical sections for supplying high frequency waves into said cavity and means connected to the other of said cylindrical sections for matching the impedance of said cavity to the material in said cavity to thereby substantially eliminate standing waves in said cavity.

3. In apparatus for heating and shaping thermo-plastic and thermo-setting material, a self-enclosing high-frequency wave conducting system comprising, two circular cylindrical sections, an intermediate mold section having a cavity for shaping said material in situ to final form, the surface of said cavity being a surface of revolution but of a diameter greater than that of said cylindrical sections, all of said sections being arranged coaxially and connected in wave-conducting relation, means coupled to one of said cylindrical sections for supplying high frequency waves into said system, means for matching the impedance of the zone of said cavity to that of the material in said cavity and means for changing the orientation of the electric vector of said waves.

4. In apparatus for heating and shaping thermoplastic and thermo-setting material, a self-enclosing high-frequency wave-conducting system including two circular, cylindrical sections, an intermediate mold section having a cavity for shaping said material in situ to final form, all of said sections being in wave conducting relation, means coupled to one of said cylindrical sections for supplying high frequency wave energy into said system, said cavity section adapted to receive a shell like article of plastic material of variable circular section, flexible conductor means for confining the wave energy between the latter and the inner surface of said cavity and means operably associated with the other cylindrical section for terminating said system in a wave impedance matching the impedance of the system throughout the zone of the cavity and the material therein.

5. In apparatus for heating and shaping a pneumatic tire casing comprising a self-enclosing high-frequency wave-conducting system including two circular cylindrical sections, an intermediate mold section having a generally toroidal shaped cross-section for shaping said material in situ to final form, said mold section having radially inwardly extending portions in electrically conducting relation with said tubular sections, an electrically conducting element extending radially inwardly from the bead areas of said tire and extending axially therebetween, means including said element and low loss dielectric spacer disks on either side of said element forming a wave-conducting path through the sidewalls of said pneumatic tire casing for high-frequency wave energy whereby the space within said cavity is in wave conducting relation with said cylindrical sections and means for varying the terminating impedance of said system to match the load to the zone of said cavity.

6. In apparatus for heating and shaping an unvulcanized pneumatic tire casing, a self-enclosing high-frequency wave conducting system including a two part mold having a cavity for shaping said casing in situ to final shape, a cavity in said mold comprising an annular central recess terminating in an outer toroidal zone to receive an unvulcanized tire casing, said system also including two circular cylindrical sections, one associated, respectively, with each of the two parts of said mold, an electrically conducting element extending radially inwardly from the bead areas of said tire and axially between the latter, said cylindrical sections opening into said central recess to thereby provide annular disk-like waveconducting paths to the respective bead portions of said tire casing, a flexible conductor electrically connected to said element and adapted to engage the inside of said tire casing to confine the wave conducting path between said beads to the shell-like tire casing, whereby the latter is interposed in the wave conducting path connecting said cylindrical sections, means for supplying transverse electric waves to one of said cylindrical sections and means in the other of said cylindrical sections for matching the high frequency wave energy into the load constituting the lossy di-electric material of said tire casing.

7. In apparatus for vulcanizing pneumatic tire casing, a self-enclosing high-frequency wave-conducting system including a two part mold having respective complementary mold cavity recesses, two circular cylindrical sections one connected coaxially to each of the respective mold parts whereby when said mold parts are assembled, the mold cavity constitutes toroidal enlargement of the wave conducting path of said cylindrical sections, an electrically conducting element extending radially inwardly from said beads and extending axially between the latter, wave-permeable means for supporting the beads of said tire casing and providing conducting paths from the respective cylindrical sections to the beads of said tire casing, flexible conducting means electrically connected to said element and engaging the inner surface of said pneumatic tire casing to thereby confine the wave-guiding path to the walls of said tire casing, means for supplying high-frequency wave power to one of said cylindrical sections and means associated with the other of said cylindrical sections for matching high-frequency wave energy into the load constituted by the material of said tire casing.

8. Apparatus for heating an annular shell-like article of generally toroidal cross-section having inner extremities substantially perpendicular to the axis of the article comprising a waveguide concentric with the axis of said article, a disc-like conducting element transverse to said toroidal axis and said waveguide and spaced from the end of the latter to cause the wave energy from said guide to divide and pass toward the inner extremities of said walls of said shell-like article in a hollow shell-like path, the surface of said cavity constituting the outer boundary of said wave path, means for supplying a circularly polarized wave having electrical vectors extending between said conducting element and the internal surface of said cavity and means external to said mold cavity for substantially eliminating reflections in said system.

9. In combination in apparatus for heating and forming to final shape an article made of thermo-plastic or thermo-setting material, an electrically self-enclosed wave-conducting system including a generator for supplying high frequency wave energy, a mold section in which said material is to be treated having an internal cavity surface of the exact final size and shape to be imparted to the article, a wave-conducting transmission section between said generator and said mold section, means connected to said system externally of said mold section for varying the phase between the wave energy entering said mold cavity from said generator and that reflected by impedance discontinuities in said system whereby the system as a whole is substantially non-resonant, said mold section having a cavity comprising an annular recess terminating in an outer generally toroidal zone having circular cross sections in planes transverse to its axis but having a portion of its cross section in the plane of its axis departing from the arc of a circle, a low-loss dielectric liner in the non-circular portion of said mold cavity for controlling the field density to compensate for variation in thickness of the material being treated in the non-circular portion of said mold cavity.

10. In apparatus for heating and forming to final shape a shell-like article of generally toroidal cross-section made of thermo-plastic or thermo-setting material, such as a pneumatic tire casing, an electrically self-enclosed wave-conducting system including a two-part mold having a cavity for shaping said article in situ to final shape, said cavity comprising an annular central recess terminating in an outer toroidal zone to receive the article being shaped, said wave conducting system also including two cylindrical sections, one associated, respectively, with each of the two parts of said mold, a disc-like electrically conducting element extending radially inwardly from the inner edges of said toroidal recess, a flexible conducting sheath bridging the outer peripheries of said disc-like conducting elements to form a bulbous shell-like wave-conducting path between said disc-like elements, means for supplying transverse electric waves to one of said cylindrical sections, means connected to the other of said cylindrical sections for matching the high frequency wave energy into said material of said article constituting the load, and means for controlling the field density to compensate for the variation in thickness of the material being treated to prevent excessive localized heating.

References Cited in the file of this patent

UNITED STATES PATENTS

| | | |
|---|---|---|
| 2,412,320 | Carter | Dec. 10, 1946 |
| 2,438,914 | Hansen | Apr. 6, 1948 |
| 2,451,992 | Te Grotenhuis | Oct. 19, 1948 |
| 2,477,347 | Posey | July 26, 1949 |
| 2,480,682 | Stiefel | Aug. 30, 1949 |
| 2,483,768 | Hershberger | Oct. 4, 1949 |
| 2,495,170 | Kinn | Jan. 17, 1950 |
| 2,497,670 | Hanson et al. | Feb. 14, 1950 |
| 2,500,752 | Hanson et al. | Mar. 14, 1950 |
| 2,537,182 | Bertrand | Jan. 9, 1951 |
| 2,537,193 | Shaw | Jan. 9, 1951 |
| 2,541,644 | Enabnit | Feb. 13, 1951 |
| 2,586,526 | Enabnit | Feb. 19, 1952 |

FOREIGN PATENTS

| | | |
|---|---|---|
| 605,655 | Great Britain | July 28, 1949 |
| 616,996 | Great Britain | Jan. 31, 1949 |